(12) United States Patent
Morikuni

(10) Patent No.: US 12,455,437 B2
(45) Date of Patent: Oct. 28, 2025

(54) OPTICAL SYSTEM AND PROJECTOR

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 434 days.

(21) Appl. No.: 18/076,596

(22) Filed: Dec. 7, 2022

(65) Prior Publication Data

US 2023/0176343 A1 Jun. 8, 2023

(30) Foreign Application Priority Data

Dec. 8, 2021 (JP) ................. 2021-199084

(51) Int. Cl.
*G02B 13/16* (2006.01)
*G02B 17/08* (2006.01)

(52) U.S. Cl.
CPC ......... *G02B 13/16* (2013.01); *G02B 17/0832* (2013.01)

(58) Field of Classification Search
CPC ............................ G02B 13/16; G02B 17/0832
USPC .......................................................... 353/98
See application file for complete search history.

(56) References Cited

U.S. PATENT DOCUMENTS

| | | |
|---|---|---|
| 2003/0035232 A1 | 2/2003 | Sasaki |
| 2011/0164311 A1 | 7/2011 | Morikuni |
| 2013/0070217 A1 | 3/2013 | Tatsuno |
| 2019/0011684 A1 | 1/2019 | Ishihara et al. |
| 2019/0166329 A1* | 5/2019 | Shiokawa ............. G02B 13/16 |
| 2020/0026161 A1 | 1/2020 | Eguchi |
| 2020/0142291 A1* | 5/2020 | Nishikawa ............. G03B 21/28 |
| 2020/0278601 A1* | 9/2020 | Yanagisawa ....... G02B 17/0856 |
| 2020/0301140 A1 | 9/2020 | Kuzuhara et al. |
| 2021/0232033 A1 | 7/2021 | Yanagisawa |
| 2022/0326520 A1 | 10/2022 | Kuzuhara et al. |
| 2024/0402492 A1 | 12/2024 | Kuzuhara et al. |

FOREIGN PATENT DOCUMENTS

| | | |
|---|---|---|
| JP | 2003-043360 A | 2/2003 |
| JP | 2011-138086 A | 7/2011 |
| JP | 2013-064816 A | 4/2013 |
| JP | 2015-087487 A | 5/2015 |
| JP | 2017-156714 A | 9/2017 |

(Continued)

*Primary Examiner* — Jerry L Brooks
(74) *Attorney, Agent, or Firm* — Oliff PLC

(57) ABSTRACT

An optical system includes a first optical system having a first optical element, and a second optical system arranged at a reduction side of the first optical system. An intermediate image is formed between the first optical system and the second optical system. The first optical element has a first reflecting surface having a concave shape. The second optical system has a first relay element, a second relay element arranged at an enlargement side of the first relay element, and a correction optical element arranged at the enlargement side of the second relay element. The first relay element has a first relay reflecting surface having a concave shape. The second relay element has a second relay reflecting surface having a convex shape. The correction optical element curves the intermediate image generated by the first and second relay elements to reduce a field curvature generated by the first optical element.

11 Claims, 3 Drawing Sheets

(56) References Cited

FOREIGN PATENT DOCUMENTS

| JP | 2019-090996 A | 6/2019 |
|----|---------------|--------|
| JP | 2021-117316 A | 8/2021 |
| WO | 2019/116730 A1 | 6/2019 |

* cited by examiner

OPTICAL SYSTEM AND PROJECTOR

The present application is based on, and claims priority from JP Application Serial Number 2021-199084, filed Dec. 8, 2021, the disclosure of which is hereby incorporated by reference herein in its entirety.

BACKGROUND

1. Technical Field

The present disclosure relates to an optical system and a projector.

2. Related Art

A projection optical system for forming an intermediate image between a reduction-side imaging plane and an enlargement-side imaging plane is described in JP-A-2011-138086 (Document 1). The projection optical system in Document 1 has a relay optical system with no power for forming the intermediate image conjugated with the reduction-side imaging plane, and an enlarging optical system for projecting the intermediate image in an enlarged manner. The relay optical system has a first lens element having positive refracting power, a reflecting member having positive refracting power, and a second lens element having positive refracting power. Light from the reduction-side imaging plane is transmitted through the first lens element, and is then reflected by the reflecting member. The light reflected by the reflecting member passes through the second lens element to form the intermediate image. The first lens element and the second lens element are formed of an integrated lens member having positive refracting power.

In the projection optical system of Document 1, the intermediate image is the same in size as the reduction-side conjugated plane, and a field curvature hardly exists. Therefore, it is difficult to include an ultra short focus optical system in which the field curvature easily occurs as the magnifying optical system.

SUMMARY

In view of the problems described above, an optical system according to the present disclosure includes a first optical system which projects a projection image formed on a reduction-side conjugated plane on an enlargement-side conjugated plane as an enlarged image. The optical system includes a first optical system having a first optical element, and a second optical system arranged at a reduction side of the first optical system. An intermediate image conjugated with the reduction-side conjugated plane and the enlargement-side conjugated plane is formed between the first optical system and the second optical system. The first optical element has a first reflecting surface having a concave shape. The second optical system has a first relay element, a second relay element arranged at an enlargement side of the first relay element, and a correction optical element arranged at the enlargement side of the second relay element. The first relay element has a first relay reflecting surface having a concave shape, and the second relay element has a second relay reflecting surface having a convex shape. The correction optical element curves the intermediate image generated by the first relay element and the second relay element to reduce a field curvature generated by the first optical element.

Then, a projector according to the present disclosure includes a light modulator arranged on a reduction-side conjugated plane and configured to modulate light emitted from a light source, and the optical system described above which is configured to project the light modulated by the light modulator.

DESCRIPTION OF EXEMPLARY EMBODIMENTS

An optical system and a projector according to some embodiments of the present disclosure will hereinafter be described with reference to the drawings.

Projector

Figure 1:
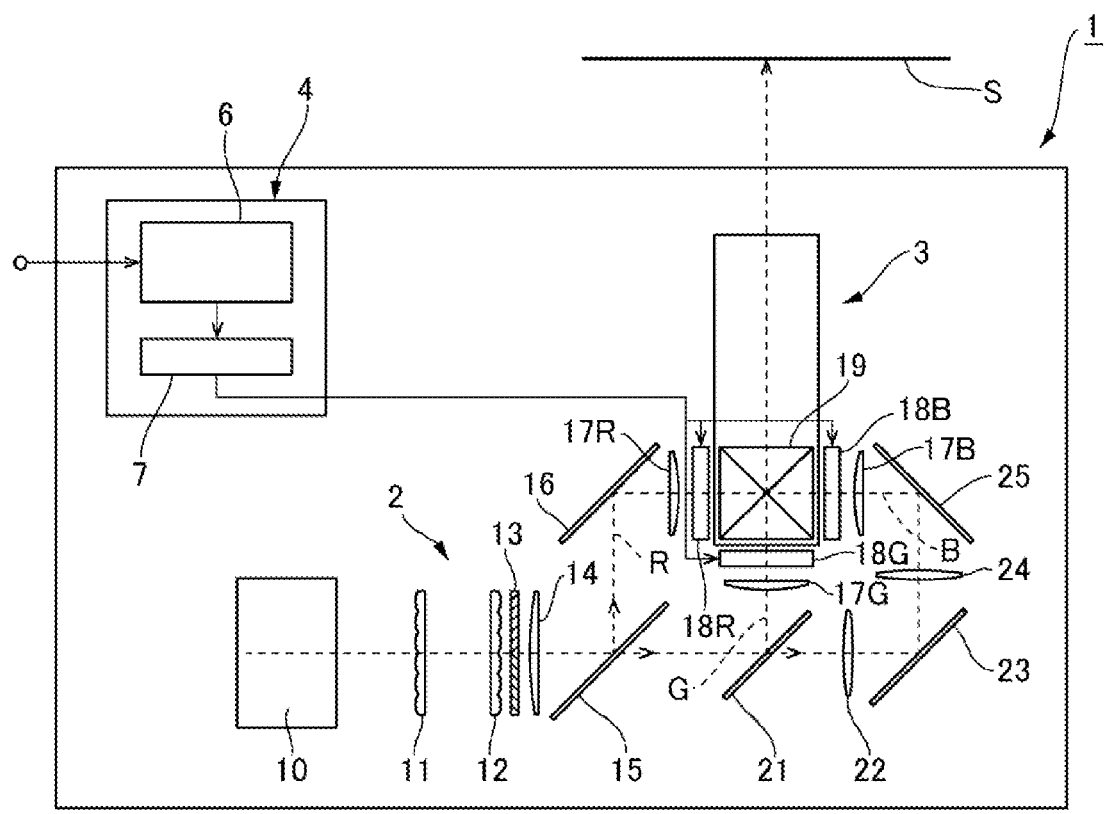
FIG. 1 is a diagram showing a schematic configuration of a projector equipped with an optical system according to the present disclosure.

FIG. 1 is a diagram showing a schematic configuration of a projector equipped with an optical system 3 according to the present disclosure. As shown in FIG. 1, the projector 1 is provided with an image formation section 2 for generating a projection image to be projected on a screen S, the optical system 3 for enlarging the projection image to project an enlarged image on the screen S, and a control section 4 for controlling an operation of the image formation section 2.

Image Formation Section and Control Section

The image formation section 2 is provided with a light source 10, a first integrator lens 11, a second integrator lens 12, a polarization conversion element 13, and a superimposing lens 14. The light source 10 is formed of, for example, a super-high pressure mercury lamp or a solid-state light source. The first integrator lens 11 and the second integrator lens 12 each have a plurality of lens elements arranged in an array. The first integrator lens 11 divides a light beam from the light source 10 into a plurality of light beams. Each of the lens elements of the first integrator lens 11 converges the light beam from the light source 10 in the vicinity of the corresponding one of the lens elements of the second integrator lens 12.

The polarization conversion element 13 converts the light from the second integrator lens 12 into predetermined linearly polarized light. The superimposing lens 14 superimposes the images of the respective lens elements of the first integrator lens 11 on the display area of each of a liquid crystal panel 18R, a liquid crystal panel 18G, and a liquid crystal panel 18B described later via the second integrator lens 12.

Further, the image formation section 2 is provided with a first dichroic mirror 15, a reflecting mirror 16 and a field lens 17R, and the liquid crystal panel 18R. The first dichroic mirror 15 reflects R light as a part of the light having entered the first dichroic mirror 15 from the superimposing lens 14, and transmits G light and B light each of which is a part of the light having entered the first dichroic mirror 15 from the superimposing lens 14. The R light having been reflected by the first dichroic mirror 15 enters the liquid crystal panel 18R via the reflecting mirror 16 and the field lens 17R. The liquid crystal panel 18R is a light modulation element. The liquid crystal panel 18R modulates the R light in accordance with an image signal to thereby form a red projection image.

Further, the image formation section 2 is provided with a second dichroic mirror 21, a field lens 17G, and the liquid crystal panel 18G. The second dichroic mirror 21 reflects the G light as a part of the light from the first dichroic mirror 15, and transmits the B light as a part of the light from the first dichroic mirror 15. The G light having been reflected by the second dichroic mirror 21 enters the liquid crystal panel 18G via the field lens 17G. The liquid crystal panel 18G is a light modulation element. The liquid crystal panel 18G modulates the G light in accordance with the image signal to thereby form a green projection image.

Further, the image formation section 2 is provided with a relay lens 22, a reflecting mirror 23, a relay lens 24, a reflecting mirror 25 and a field lens 17B, and the liquid crystal panel 18B and a cross dichroic prism 19. The B light having been transmitted through the second dichroic mirror 21 enters the liquid crystal panel 18B via the relay lens 22, the reflecting mirror 23, the relay lens 24, the reflecting mirror 25, and the field lens 17B. The liquid crystal panel 18B is a light modulation element. The liquid crystal panel 18B modulates the B light in accordance with the image signal to thereby form a blue projection image.

The liquid crystal panel 18R, the liquid crystal panel 18G, and the liquid crystal panel 18B surround the cross dichroic prism 19 from three directions. The cross dichroic prism 19 is a light combining prism, and generates the projection image obtained by combining the light beams modulated by the respective liquid crystal panels 18R, 18G, and 18B with each other.

The optical system 3 projects the projection image combined by the cross dichroic prism 19 in an enlarged manner. The control section 4 is provided with an image processing section 6 to which an external image signal such as a video signal is input, and a display drive section 7 for driving the liquid crystal panel 18R, the liquid crystal panel 18G, and the liquid crystal panel 18B based on the image signals output from the image processing section 6.

The image processing section 6 converts the image signal input from external equipment into image signals including the tones and so on of the respective colors. The display drive section 7 makes the liquid crystal panel 18R, the liquid crystal panel 18G, and the liquid crystal panel 18B operate based on the projection image signals of the respective colors output from the image processing section 6. Thus, the image processing section 6 displays the projection images corresponding to the image signals on the liquid crystal panel 18R, the liquid crystal panel 18G, and the liquid crystal panel 18B, respectively.

Optical System

Figure 2:
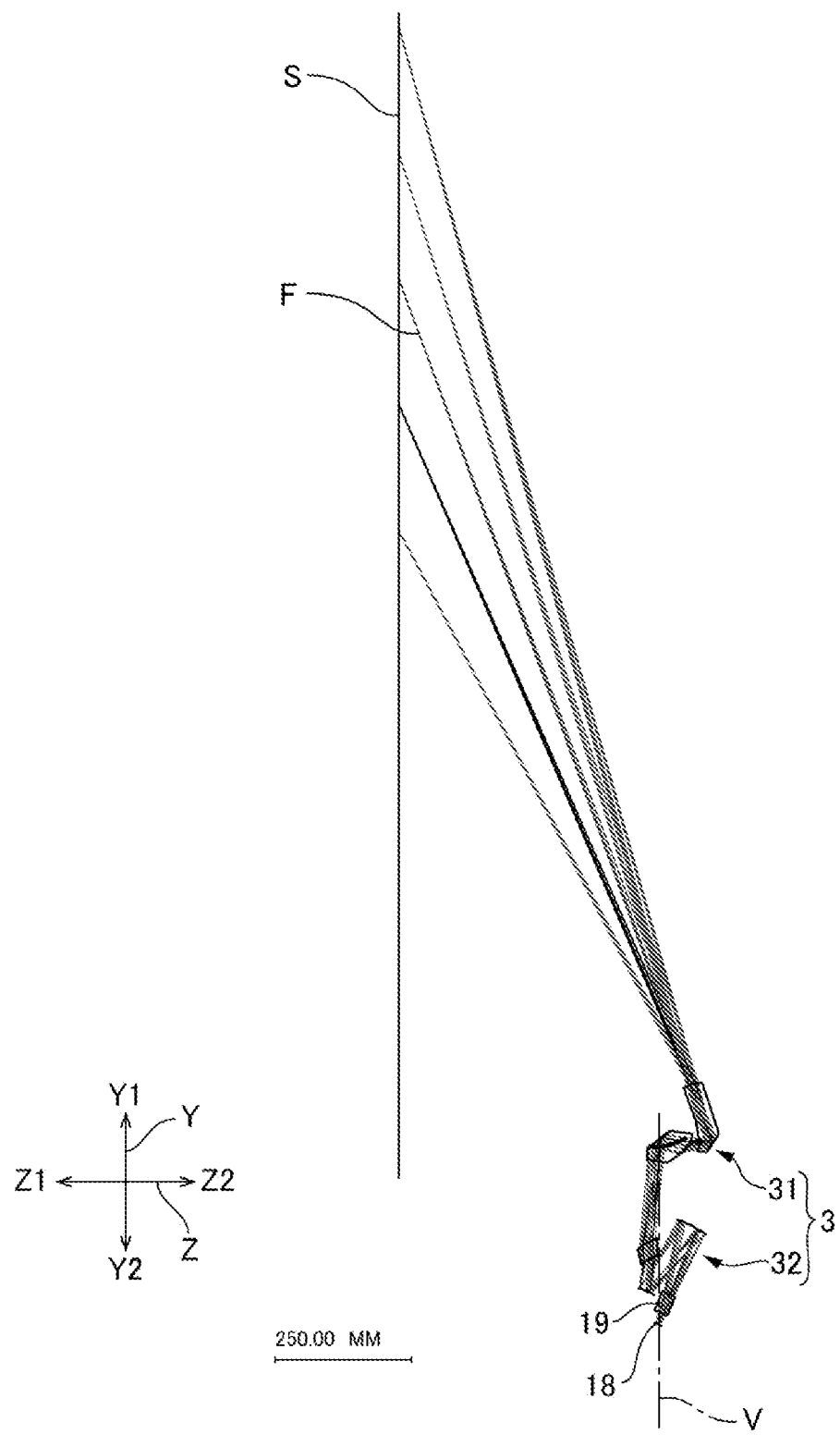
FIG. 2 is a ray chart schematically showing a whole of an optical system according to Practical Example 1.
Figure 3:
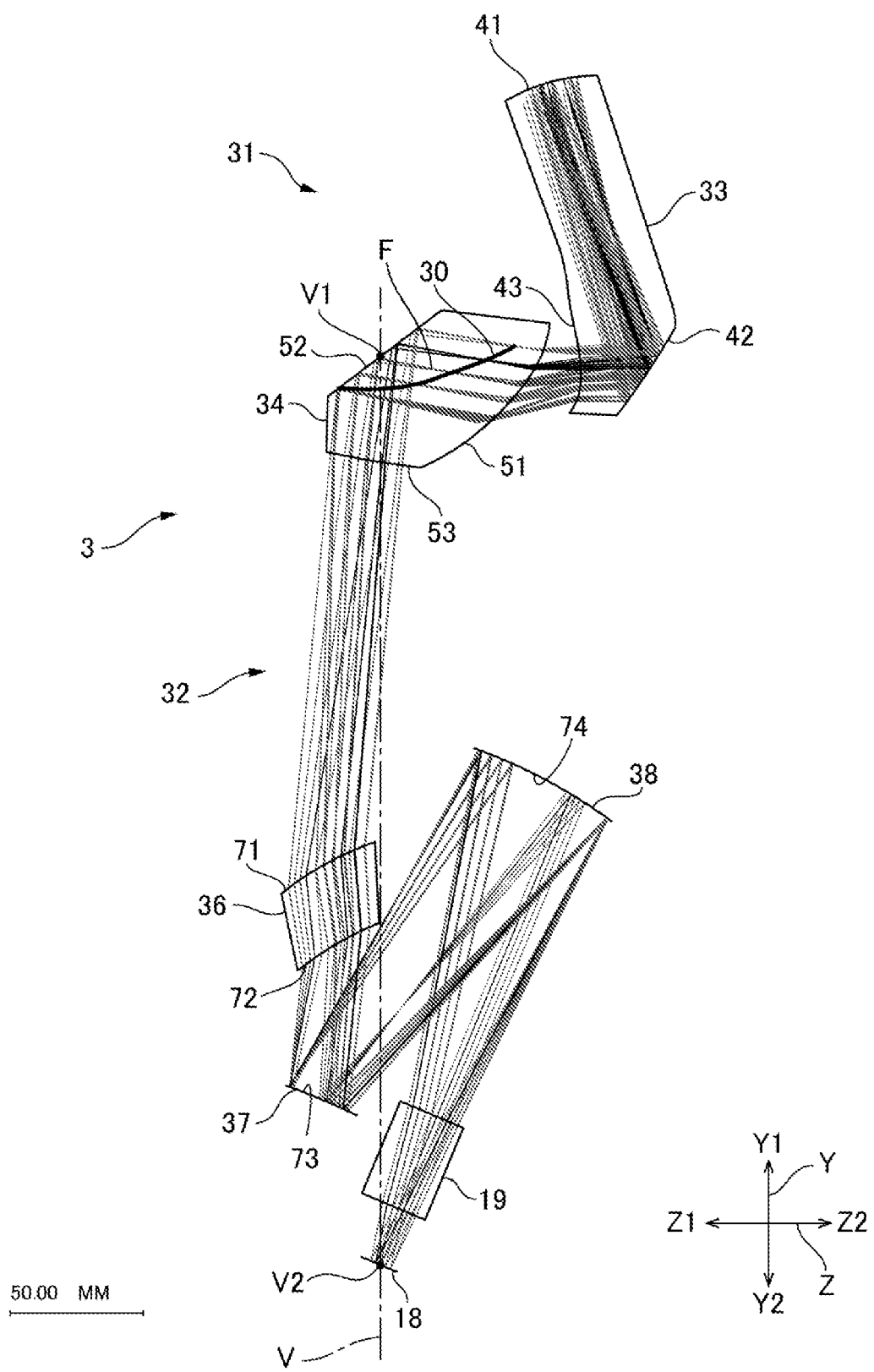
FIG. 3 is a ray chart of the optical system according to Practical Example 1.

FIG. 2 is a ray chart schematically showing a whole of the optical system. FIG. 3 is a ray chart of the optical system. As shown in FIG. 2 and FIG. 3, on a reduction-side conjugated plane of the optical system 3, there is disposed the liquid crystal panel 18.

In the following description, three axes perpendicular to each other are defined as an X axis, a Y axis, and a Z axis for the sake of convenience. Further, a width direction of the screen S as the enlargement-side conjugated plane is defined as an X-axis direction, a vertical direction of the screen S is defined as a Y-axis direction, and a direction perpendicular to the screen S is defined as a Z-axis direction. In the Y-axis direction, an upper side of the screen S is defined as a Y1 direction, and a lower side of the screen S is defined as a Y2 direction. In the Z-axis direction, a side at which the screen S is located is defined as a Z1 direction, and an opposite side to the Z1 direction is defined as a Z2 direction.

As shown in FIG. 2, the optical system 3 according to the present example has a first optical system 31 and a second optical system 32 disposed in sequence from an enlargement side toward a reduction side. The first optical system 31 and the second optical system 32 are arranged along the Y-axis direction. The screen S is located at the Z1 direction side of the optical system 3.

Then, a specific configuration of the optical system 3 according to the present example will be described. As shown in FIG. 3, the optical system 3 is provided with a first optical element 33, a second optical element 34, a correction optical element 36, a second relay element 37, and a first relay element 38 in sequence from the enlargement side toward the reduction side.

The first optical element 33 is formed of a single optical element. The first optical element 33 is located at the Z2 direction side of the second optical element 34. The first optical element 33 has a first transmission surface 41, a first reflecting surface 42 located at the reduction side of the first transmission surface 41, and a second transmission surface 43 located at the reduction side of the first reflecting surface 42.

The first transmission surface 41 is provided with a convex shape facing to the Y1 direction. The first transmission surface 41 has positive power. The first transmission surface 41 is provided with an aspherical shape.

The first reflecting surface 42 is located at the Y2 direction side of the first transmission surface 41. The first reflecting surface 42, namely the first reflecting surface 42 provided with a concave shape concaved toward the Z2 direction, has positive power. The first reflecting surface 42 is provided with an aspherical shape. The first reflecting surface 42 is formed by disposing a reflective coating layer on the outer side surface at the Z2 direction side of the first optical element 33.

The second transmission surface 43 is provided with a convex shape facing to the Z1 direction. The second transmission surface 43 has positive power. The second transmission surface 43 is provided with an aspherical shape.

The second optical element 34 is formed of a single optical element. The second optical element 34 is located at the Z1 direction side of the first optical element 33. The second optical element 34 has a third transmission surface 51, a second reflecting surface 52 located at a reduction side of the third transmission surface 51, and a fourth transmission surface 53 located at a reduction side of the second reflecting surface 52.

The third transmission surface 51 is opposed in the Z-axis direction to the second transmission surface 43. The third transmission surface 51, namely the third transmission surface 51 provided with a convex shape facing to the Z2 direction, has positive power. The third transmission surface 51 is provided with an aspherical shape.

The second reflecting surface 52 is a plane mirror with no power. The second reflecting surface 52 is tilted 45° with respect to the Y axis and the Z axis. The second reflecting surface 52 folds the light path as much as 90° between the third transmission surface 51 and the fourth transmission surface 53. The second reflecting surface 52 is formed by disposing a reflective coating layer on the outer side surface at the Z1 direction side of the second optical element 34.

The fourth transmission surface 53 faces to the Y2 direction. The fourth transmission surface 53 has positive power. The fourth transmission surface 53 is provided with an aspherical shape.

The correction optical element 36 is formed of a lens made of resin. The correction optical element 36 is located at the Y2 direction side of the second optical element 34. The correction optical element 36 has negative power. In the correction optical element 36, a first surface 71 at the enlargement side is a convex surface, and a second surface 72 at the reduction side is a concave surface. The first surface 71 and the second surface 72 are each provided with an aspherical shape.

The second relay element 37 is located at the Y2 direction side of the correction optical element 36. The second relay element 37 is provided with a second relay reflecting surface 73. The second relay reflecting surface 73 is provided with a convex shape. The second relay reflecting surface 73 is provided with an aspherical shape.

The first relay element 38 is located at the Y1 direction side of the second relay element 37. The first relay element 38 is provided with a first relay reflecting surface 74. The first relay reflecting surface 74 is provided with a concave shape. The first relay reflecting surface 74 is provided with an aspherical shape.

Here, in the present example, the first optical element 33 and the third transmission surface 51 of the second optical element 34 constitute the first optical system 31. Further, the fourth transmission surface 53 of the second optical element 34, the correction optical element 36, the second relay element 37, and the first relay element 38 constitute the second optical system 32. The second optical system 32 is a relay optical system.

As shown in FIG. 2, the liquid crystal panel 18 arranged at the reduction-side conjugated plane of the optical system 3 forms the projection image. The light from the liquid crystal panel 18 side passes through the second optical system 32, and is then folded as much as 90° by the second reflecting surface 52 of the second optical element 34, and then proceeds toward the Z2 direction. The light proceeding toward the Z2 direction is folded by the first reflecting surface 42 of the first optical element 33 toward the Z1 direction and the Y1 direction, and then reaches the screen S.

Further, as shown in FIG. 2 and FIG. 3, the optical system 3 forms an intermediate image 30 conjugated with the enlargement-side conjugated plane and the reduction-side conjugated plane between the first optical system 31 and the second optical system 32. In the present example, the intermediate image 30 is formed between the third transmission surface 51 of the second optical element 34 and the second reflecting surface 52 of the second optical element 34. On this occasion, since the correction optical element 36 is a lens having power, the correction optical element 36 curves and enlarges the intermediate image 30 to be generated by the first relay element 38 and the second relay element 37. Since the fourth transmission surface 53 has power, the fourth transmission surface 53 curves and enlarges the intermediate image 30 generated by the correction optical element 36.

As shown in FIG. 2 and FIG. 3, when defining a straight line connecting a first intersection V1 at which a principal ray F having an image height corresponding to the center of the enlarged image to be projected on the screen S crosses the second reflecting surface 52, and a second intersection V2 at which the principal ray F crosses the liquid crystal panel 18 as an imaginary axis V, the imaginary axis V is parallel to the screen S. Here, the image height corresponding to the center of the enlarged image means an image height at the center in the Y-axis direction and the X-axis direction of the enlarged image.

Lens data of the optical system 3 are as follows. Surface numbers are attached in sequence from the reduction side toward the enlargement side. Reference symbols are reference symbols of the liquid crystal panels, the dichroic prisms, the lenses, and the screen. Data of the surface numbers which do not correspond to the liquid crystal panels, the dichroic prisms, the lenses, or the screen are dummy data. The surfaces having the surface numbers attached with "*" are aspherical surfaces. The reference symbol R represents a curvature radius. The reference symbol D represents an axial surface distance. The reference symbol nd represents a refractive index. The reference symbol vd represents an Abbe number. The reference symbol Y represents an aperture radius. The units of R, D, and Y are millimeters. It should be noted that the lens data in the present example are designed using CODE V produced by Synopsys, INC.

| REFERENCE SYMBOL | SURFACE NUMBER | R | D | nd | vd | MODE | Y |
|---|---|---|---|---|---|---|---|
| 18 | 0 | 0.00000 | 22.000000 | | | REFRACTION | |
| 19 | 1 | 0.00000 | 37.300000 | 1.516800 | 64.17 | REFRACTION | 19.5290 |
| | 2 | 0.00000 | 131.867527 | | | REFRACTION | 20.8530 |
| 38 | *3 | −209.12031 | −145.000000 | | | REFLECTION | 28.1090 |
| 37 | *4 | −385.71827 | 66.496815 | | | REFLECTION | 20.0000 |
| 36 | *5 | −110.41423 | 28.901060 | 1.509398 | 56.47 | REFRACTION | 27.5930 |
| | *6 | −122.04370 | 109.288489 | | | REFRACTION | 27.1590 |
| 34 | *7 | 5510.58422 | 82.175433 | 1.509398 | 56.47 | REFRACTION | 59.4390 |
| | 8 | 0.00000 | −17.756111 | 1.509398 | 56.47 | REFLECTION | 84.0620 |
| | *9 | −104.13541 | −3.819383 | | | REFRACTION | 66.6210 |
| 33 | *10 | −66.33908 | −130.000000 | 1.509398 | 56.47 | REFRACTION | 55.9260 |
| | *11 | 36.50445 | 0.000000 | 1.509398 | 56.47 | REFLECTION | 54.8470 |
| | *12 | −70.00000 | 0.000000 | | | REFRACTION | 45.6220 |
| | 13 | 0.00000 | 0.000000 | | | REFRACTION | 1899.6260 |
| S | 14 | 0.00000 | 0.000000 | | | REFRACTION | 2140.4110 |

Aspheric coefficients are as follows.

| SURFACE NUMBER | 3 | 4 | 5 | 6 |
|---|---|---|---|---|
| CONIC CONSTANT | 1.396563E+01 | 0 | −6.289454E+00 | 8.223611E+00 |

-continued

| | | | | |
|---|---|---|---|---|
| 4-TH-ORDER COEFFICIENT | 1.838498E−07 | −1.570685E−07 | −3.731301E−07 | 4.325503E−07 |
| 6-TH-ORDER COEFFICIENT | 3.818978E−11 | 2.731995E−11 | −1.473192E−11 | 3.231727E−10 |
| 8-TH-ORDER COEFFICIENT | 3.335276E−15 | −2.695231E−13 | −1.198218E−14 | −3.663914E−13 |
| 10-TH-ORDER COEFFICIENT | 4.333801E−18 | 2.674525E−16 | −1.184285E−16 | 2.484916E−16 |

| SURFACE NUMBER | 7 | 9 | 10 | 11 |
|---|---|---|---|---|
| CONIC CONSTANT | 6E+01 | −4.686224E−02 | 6.538515E−02 | −1.662726E+00 |
| 4-TH-ORDER COEFFICIENT | −4.450294E−07 | 5.883883E−06 | 9.967068E−07 | −1.300763E−06 |
| 6-TH-ORDER COEFFICIENT | 3.101317E−10 | −1.450153E−09 | 1.399283E−09 | 2.646661E−10 |
| 8-TH-ORDER COEFFICIENT | −5.044936E−14 | 1.776836E−13 | −5.306366E−13 | −8.123003E−15 |
| 10-TH-ORDER COEFFICIENT | 0 | −8.00476E−18 | 7.865811E−17 | −1.278694E−18 |

| SURFACE NUMBER | 12 |
|---|---|
| CONIC CONSTANT | 0 |
| 4-TH-ORDER COEFFICIENT | 5.316967E−09 |
| 6-TH-ORDER COEFFICIENT | −6.475294E−12 |
| 8-TH-ORDER COEFFICIENT | 3.281491E−15 |
| 10-TH-ORDER COEFFICIENT | −5.46149E−19 |

Ray coordinates on an object surface are as follows.

| RAY NUMBER | X COORDINATE | Y COORDINATE |
|---|---|---|
| 1 | 0 | −17.20 |
| 2 | 0 | −15.20 |
| 3 | 0 | −13.20 |
| 4 | 0 | −11.20 |
| 5 | 0 | −9.20 |
| 6 | 1.60 | −17.20 |
| 7 | 1.60 | −15.20 |
| 8 | 1.60 | −13.20 |
| 9 | 1.60 | −11.20 |
| 10 | 1.60 | −9.20 |
| 11 | 3.20 | −17.20 |
| 12 | 3.20 | −15.20 |
| 13 | 3.20 | −13.20 |
| 14 | 3.20 | −11.20 |
| 15 | 3.20 | −9.20 |
| 16 | 4.80 | −17.20 |
| 17 | 4.80 | −15.20 |
| 18 | 4.80 | −13.20 |
| 19 | 4.80 | −11.20 |
| 20 | 4.80 | −9.20 |
| 21 | 6.40 | −17.20 |
| 22 | 6.40 | −15.20 |
| 23 | 6.40 | −13.20 |
| 24 | 6.40 | −11.20 |
| 25 | 6.40 | −9.20 |

Further, in the present example, the surface numbers 3, 4, 5, 6, 7, 8, 10, 11, 12, 13, and 14 are each an eccentric surface. Parameters of the eccentric surfaces are as follows.

| SURFACE NUMBER | 3 |
|---|---|
| TYPE OF ECCENTRICITY | DECENTERED AND BENT |
| PARAMETER X | 0.0000 |
| PARAMETER Y | 0.0000 |
| PARAMETER Z | 0.0000 |
| PARAMETER α | −5.0000 |

| SURFACE NUMBER | 4 |
|---|---|
| TYPE OF ECCENTRICITY | DECENTERED AND BENT |
| PARAMETER X | 0.0000 |
| PARAMETER Y | 0.0000 |
| PARAMETER Z | 0.0000 |
| PARAMETER α | 9.0000 |

| SURFACE NUMBER | 5 |
|---|---|
| TYPE OF ECCENTRICITY | NORMAL |
| PARAMETER X | 0.0000 |
| PARAMETER Y | 7.6642 |
| PARAMETER Z | 0.0000 |
| PARAMETER α | 38.5647 |

| SURFACE NUMBER | 6 |
|---|---|
| TYPE OF ECCENTRICITY | NORMAL |
| PARAMETER X | 0.0000 |
| PARAMETER Y | −5.7937 |
| PARAMETER Z | 0.0000 |
| PARAMETER α | 0.0000 |

| SURFACE NUMBER | 7 |
|---|---|
| TYPE OF ECCENTRICITY | NORMAL |
| PARAMETER X | 0.0000 |
| PARAMETER Y | −101.0137 |
| PARAMETER Z | 0.0000 |
| PARAMETER α | −32.2800 |

| SURFACE NUMBER | 8 |
|---|---|
| TYPE OF ECCENTRICITY | DECENTERED AND BENT |
| PARAMETER X | 0.0000 |

-continued

| | |
|---|---|
| PARAMETER Y | 0.0000 |
| PARAMETER Z | 0.0000 |
| PARAMETER α | 45.0000 |
| SURFACE NUMBER | 10 |
| TYPE OF ECCENTRICITY | NORMAL |
| PARAMETER X | 0.0000 |
| PARAMETER Y | −3.6080 |
| PARAMETER Z | 0.0000 |
| PARAMETER α | 4.8964 |
| SURFACE NUMBER | 11 |
| TYPE OF ECCENTRICITY | NORMAL |
| PARAMETER X | 0.0000 |
| PARAMETER Y | 0.0000 |
| PARAMETER Z | 81.0000 |
| PARAMETER α | 2.0299 |
| SURFACE NUMBER | 12 |
| TYPE OF ECCENTRICITY | GLOBAL COORDINATE |
| GLOBAL REFERENCE SURFACE | 11 |
| PARAMETER X | 0.0000 |
| PARAMETER Y | −70.0000 |
| PARAMETER Z | 37.9493 |
| PARAMETER α | −90.0000 |
| SURFACE NUMBER | 13 |
| TYPE OF ECCENTRICITY | GLOBAL COORDINATE |
| GLOBAL REFERENCE SURFACE | 11 |
| PARAMETER X | 0.0000 |
| PARAMETER Y | 0.0000 |
| PARAMETER Z | 600.0000 |
| PARAMETER α | 0.0000 |
| SURFACE NUMBER | 14 |
| TYPE OF ECCENTRICITY | DECENTERED AND BENT |
| PARAMETER X | 0.0000 |
| PARAMETER Y | 0.0000 |
| PARAMETER Z | 0.0000 |
| PARAMETER α | 2.0197 |

Functions and Advantages

The optical system 3 according to the present example is provided with the first optical system 31 having the first optical element 33, and the second optical system 32 arranged at the reduction side of the first optical system 31. The intermediate image 30 conjugated with the reduction-side conjugated plane and the enlargement-side conjugated plane is formed between the first optical system 31 and the second optical system 32. The first optical element 33 has the first reflecting surface 42 having a concave shape. The second optical system 32 has the first relay element 38, the second relay element 37 arranged at the enlargement side of the first relay element 38, and the correction optical element 36 arranged at the enlargement side of the first relay element. The first relay element 38 has the first relay reflecting surface 74 having a concave shape. The second relay element 37 has the second relay reflecting surface 73 having a convex shape. The correction optical element 36 curves the intermediate image 30 generated by the first relay element 38 and the second relay element 37 to thereby reduce the field curvature caused by the first optical element 33.

According to the present disclosure, the first optical system 31 arranged at the enlargement side of the intermediate image 30 has the first optical element 33 provided with the first reflecting surface 42 having the concave shape. Therefore, by increasing the power of the first reflecting surface 42, it is possible to shorten the focal length of the optical system 3. Here, when increasing the power of the first optical element 33, the field curvature occurs due to the first optical element 33. However, such a field curvature can be reduced by the correction optical element 36. Therefore, it is possible to suppress the field curvature to be generated in the enlarged image to be formed on the screen S. Further, since the first reflecting surface 42 having the concave shape is used for magnifying the intermediate image 30, it is possible to prevent the growth in size of the optical system 3 compared to when magnifying the intermediate image 30 using a lens provided with a transmission surface having a convex shape, or a reflecting member provided with a reflecting surface having a convex shape.

Further, the second relay reflecting surface 73 has a convex shape. In other words, the second relay reflecting surface 73 has power. Therefore, it is possible to curve the intermediate image 30 with the second relay reflecting surface 73. Thus, it becomes possible to make both of the second relay reflecting surface 73 and the correction optical element 36 share the function of reducing the field curvature to be generated by the first optical element 33.

In the present example, the correction optical element 36 is a lens made of resin. Therefore, it is possible to adopt a complicated shape as each of the transmission surfaces of the correction optical element 36. Thus, it becomes easy to reduce the field curvature generated by the first optical element 33, and therefore, it becomes easy to further shorten the focal distance of the optical system. Further, the correction optical element 36 is provided with aspherical shapes on both surfaces. Therefore, it is possible to correct a variety of aberrations in the intermediate image 30.

In the present example, the first optical element 33 is provided with the first transmission surface 41, the first reflecting surface 42 arranged at the reduction side of the first transmission surface 41, and the second transmission surface 43 arranged at the reduction side of the first reflecting surface 42. Therefore, it is possible to control the ray proceeding from the intermediate image 30 side toward the first reflecting surface 42 using the second transmission surface 43. In other words, it is possible to control an amount of the field curvature of the intermediate image 30 formed at the reduction side of the first reflecting surface 42. Thus, it is possible to suppress an increase in the amount of the field curvature of the intermediate image 30 occurring in the first optical system, and therefore, it becomes easier to shorten the focal length of the optical system 3. Further, thus, it is possible to reduce the burden of the field curvature correction handled by the second optical system 32 side.

In the present example, the first transmission surface 41 and the second transmission surface 43 are each provided with an aspherical shape. Therefore, it is easier to correct a variety of aberrations in the enlarged image.

Further, in the present example, when defining the straight line connecting the first intersection V1 at which the principal ray F having the image height corresponding to the center of the enlarged image to be projected on the screen S crosses the second reflecting surface 52, and the second intersection V2 at which the principal ray F crosses the liquid crystal panel 18 as the imaginary axis V, the imaginary axis V is parallel to the screen S. Thus, it is possible to arrange the optical elements arranged at the reduction side of the second optical element 34 provided with the second reflecting surface 52 in parallel to the enlargement-side imaging plane. Therefore, it is possible to prevent the optical elements to be arranged at the reduction side of the second optical element 34 from interfering with the enlargement-side imaging plane. Therefore, it is possible to install the optical system 3 at a position close to the screen S.

Further, the present example has the second optical element 34 provided with the second reflecting surface 52. The second optical element 34 is provided with the third transmission surface 51, the second reflecting surface 52 arranged at the reduction side of the third transmission surface 51, and the fourth transmission surface 53 arranged at the reduction side of the second reflecting surface. The third transmission surface 51 constitutes the first optical system 31, and the fourth transmission surface 53 constitutes the second optical system 32. The intermediate image 30 is formed between the second reflecting surface 52 and the third transmission surface 51 inside the second optical element 34. Thus, the third transmission surface 51 and the fourth transmission surface 53 are formed in the vicinities of the enlargement side and the reduction side of the intermediate image 30. Therefore, it is easy to correct a variety of aberrations to be generated in the enlarged image. Further, it is possible to curve the intermediate image 30 with the fourth transmission surface 53 of the second optical element 34. Thus, it becomes possible to make the fourth transmission surface 53, the second relay reflecting surface 73, and the correction optical element 36 share the function of reducing the field curvature to be generated by the first optical element 33.

Other Embodiments

It should be noted that in the optical system 3 according to the present example, it is possible for the imaginary axis V to be configured so as to get away from the screen S as proceeding from the enlargement side toward the reduction side. Thus, the optical elements to be arranged at the reduction side of the second optical element 34 can be arranged in a direction of getting away from the enlargement-side imaging plane. Therefore, it is possible to prevent the optical elements to be arranged at the enlargement side of the second optical element 34 from interfering with the enlargement-side imaging plane. Therefore, it is possible to install the optical system at a position close to the screen S.

What is claimed is:

1. An optical system configured to project a projection image formed on a reduction-side conjugated plane on an enlargement-side conjugated plane as an enlarged image, the optical system comprising:
   a first optical system having a first optical element; and
   a second optical system arranged at a reduction side of the first optical system, wherein
   an intermediate image conjugated with the reduction-side conjugated plane and the enlargement-side conjugated plane is formed between the first optical system and the second optical system,
   the first optical element has a first reflecting surface having a concave shape,
   the second optical system has a first relay element, a second relay element arranged at an enlargement side of the first relay element, and a correction optical element arranged at the enlargement side of the second relay element,
   the first relay element has a first relay reflecting surface having a concave shape,
   the second relay element has a second relay reflecting surface having a convex shape, and
   the correction optical element curves the intermediate image generated by the first relay element and the second relay element to reduce a field curvature generated by the first optical element.

2. The optical system according to claim 1, wherein the correction optical element is a lens made of resin.

3. The optical system according to claim 2, wherein the correction optical element has aspherical shapes on both surfaces.

4. The optical system according to claim 1, wherein the first optical element has a first transmission surface, the first reflecting surface arranged at the reduction side of the first transmission surface, and a second transmission surface arranged at the reduction side of the first reflecting surface.

5. The optical system according to claim 4, wherein the first transmission surface and the second transmission surface are provided with aspherical shapes.

6. The optical system according to claim 1, further comprising:
   a second reflecting surface arranged between the first optical system and the second optical system.

7. The optical system according to claim 6, wherein
   an imaginary axis is parallel to the enlargement-side conjugated plane, the imaginary axis being as a straight line connecting a first intersection and a second intersection,
   a principal ray of an image height corresponding to a center of the enlarged image to be projected on the enlargement-side conjugated plane intersects the second reflecting surface at the first intersection, and
   the principal ray intersects the reduction-side conjugated plane at the second intersection.

8. The optical system according to claim 6, wherein
   an imaginary axis gets away from the enlargement-side conjugated plane as proceeding from the enlargement side toward the reduction side, the imaginary axis being as a straight line connecting a first intersection and a second intersection,
   a principal ray of an image height corresponding to a center of the enlarged image to be projected on the enlargement-side conjugated plane intersects the second reflecting surface at the first intersection, and
   the principal ray intersects the reduction-side conjugated plane at the second intersection.

9. The optical system according to claim 7, further comprising:
   a second optical element having the second reflecting surface, wherein
   the second optical element has a third transmission surface, the second reflecting surface arranged at the reduction side of the third transmission surface, and a fourth transmission surface arranged at the reduction side of the second reflecting surface,
   the third transmission surface constitutes the first optical system,
   the fourth transmission surface constitutes the second optical system, and
   the intermediate image is formed between the second reflecting surface and the third transmission surface inside the second optical element.

10. The optical system according to claim 8, further comprising:
    a second optical element having the second reflecting surface, wherein
    the second optical element has a third transmission surface, the second reflecting surface arranged at the reduction side of the third transmission surface, and a fourth transmission surface arranged at the reduction side of the second reflecting surface,
the third transmission surface constitutes the first optical system,
the fourth transmission surface constitutes the second optical system, and
the intermediate image is formed between the second reflecting surface and the third transmission surface inside the second optical element.

11. A projector comprising:
a light modulator arranged on the reduction-side conjugated plane and configured to modulate light emitted from a light source; and
the optical system according to claim 1 configured to project the light modulated by the light modulator.

* * * * *